United States Patent [19]
Tuulos et al.

[11] Patent Number: 5,509,118
[45] Date of Patent: Apr. 16, 1996

[54] FAULT TOLERANT CHANGE DISTRIBUTION METHOD IN A DISTRIBUTED DATABASE SYSTEM

[75] Inventors: Matti Tuulos, Tampere; Jukka Pentikäinen, Kangasala, both of Finland

[73] Assignee: Nokia Telecommunications Oy, Espoo, Finland

[21] Appl. No.: 157,025

[22] PCT Filed: Mar. 31, 1993

[86] PCT No.: PCT/FI93/00134

§ 371 Date: Dec. 1, 1993

§ 102(e) Date: Dec. 1, 1993

[87] PCT Pub. No.: WO93/20524

PCT Pub. Date: Oct. 14, 1993

[30] Foreign Application Priority Data

Apr. 1, 1992 [FI] Finland ................................. 921442

[51] Int. Cl.⁶ .................................................. G06F 15/40
[52] U.S. Cl. ............................. 395/182.14; 395/182.16; 395/182.02; 395/650
[58] Field of Search ............................. 395/575, 182.14, 395/182.16, 182.02, 650; 379/1; 455/33.1

[56] References Cited

U.S. PATENT DOCUMENTS 5,212,788  5/1993  Lomet et al. .......................... 395/600
5,247,664  9/1993  Thompson et al. ..................... 395/600

FOREIGN PATENT DOCUMENTS 2420425  4/1991  European Pat. Off. ..

OTHER PUBLICATIONS

Fernardez et al, Database Security and Integrity, 1981, pp. 280–285.

Alewine et al, Branch Recovery with Complier Assisted–Multiple Instruction Retry, Fault–Tolerant Computing, 1992 Int'l Symposium, at 66.

Primary Examiner—Robert W. Beausoliel, Jr.
Assistant Examiner—Alan M. Fisch
Attorney, Agent, or Firm—Cushman Darby & Cushman

[57] ABSTRACT

A fault tolerant change distribution method in a distributed database system including at least two separate intercommunicating databases. At least part of the stored data is identical in the different databases. The changeable data items of the databases are provided with state fields, whereby, after a data item has been added, deleted or modified, the state field of the respective data item is set in a state which indicates that the change should be transmitted to another database. When the change has been transmitted to the other database, an acknowledgement of receipt of the change is awaited from the other database, whereafter the state field of the data item is set in a state which indicates that the change has been transmitted.

8 Claims, 1 Drawing Sheet

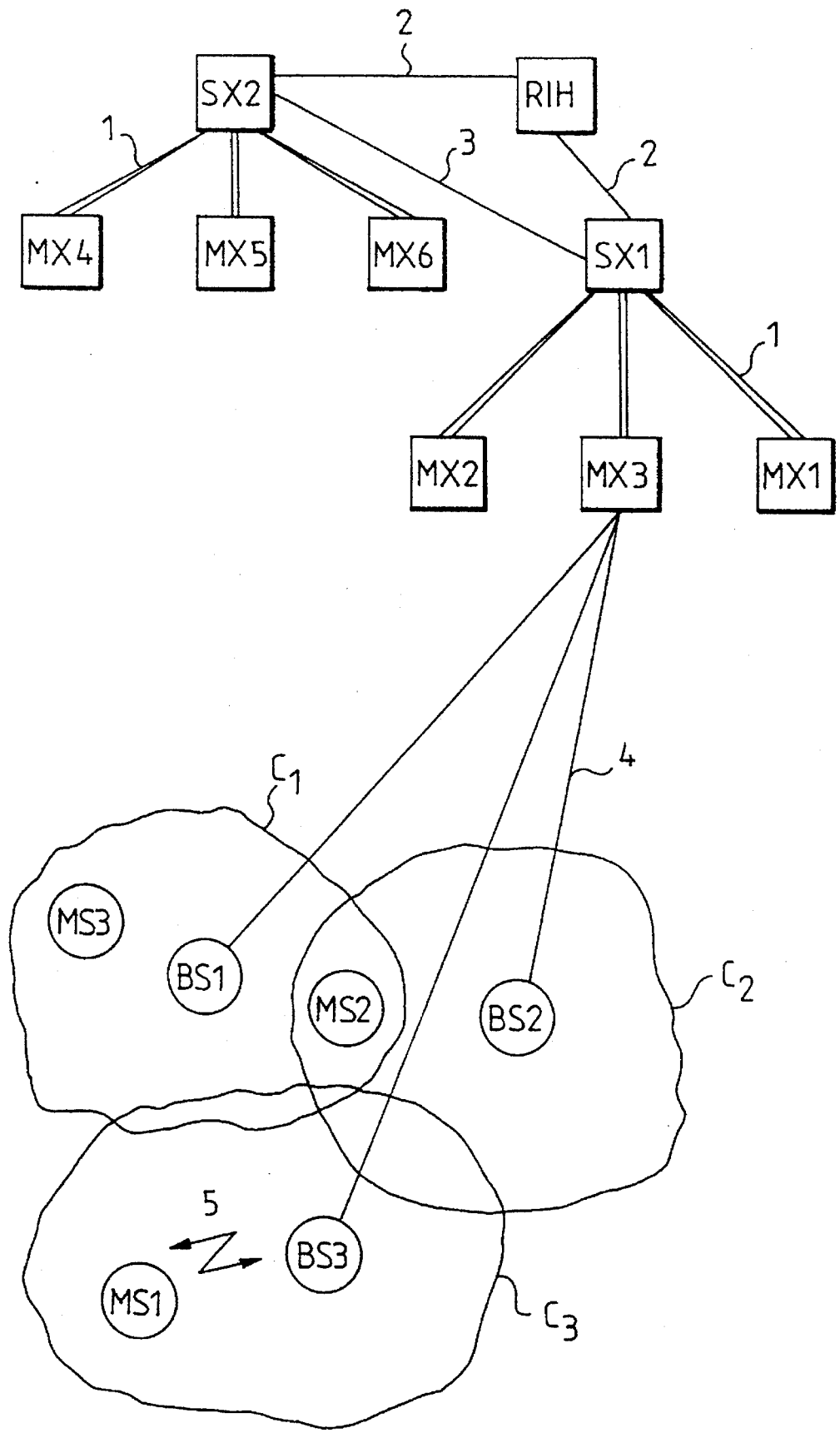

FAULT TOLERANT CHANGE DISTRIBUTION METHOD IN A DISTRIBUTED DATABASE SYSTEM

FIELD OF THE INVENTION

The present invention relates to a fault tolerant change distribution method in a distributed database system comprising at least two separate intercommunicating databases, at least part of the data stored therein having identical contents in the different databases.

A distributed database system refers typically to a system with two or more separate intercommunicating databases. At least part of the stored data is identical in two or more databases. Therefore, when common data is changed in one of these databases, the same change must be made in all the other databases containing the same data in order that the required uniformity of the data would be maintained in the database system. Under normal circumstances, a database in which certain data has been changed first simply transmits the change to the other databases through interconnecting links. Problems arise, however, when faults occurring either in the databases or in the interconnecting links prevent the transmission of a change to all or part of the databases.

Conventionally, this problem has been solved by storing the changes in special buffers in the databases until they have been transmitted. This method has, however, serious drawbacks: 1) separate buffers may require a significant amount of additional memory capacity, 2) the updating of buffers requires extra computer resources, and 3) buffer overflows may occur. In case of a buffer overflow, some data is always lost, and thus the validity of the data suffers. Processes preventing overflows and processes used for recovering from overflows are complicated, and compromises must often be made in practical applications.

SUMMARY OF THE INVENTION

The object of the invention is to provide such a fault tolerant change distribution method for a distributed database system that solves the above-mentioned problems.

This and other objects and advantages of the invention are achieved with a fault tolerant change distribution method of the type described in the introduction, which is characterized in that it comprises the steps of (a) providing the changeable data items of the databases with state fields, (b) after a data item has been added, deleted or modified, setting the state field of said data item in a state which indicates that the change should be transmitted to another database, (c) transmitting the change to the other database, (d) waiting for an acknowledgement of receipt of the change from the other database, and (e) after the acknowledgement has been received, setting the state field of the changed data item in a state which indicates that the change has been transmitted.

The basic idea of the method of the invention is to add a state information field to each data item in a distributed database system instead of using separate buffers for storing changes. The state information field indicates how far the distribution of a data item/change has advanced in the distributed database system. According to the invention, the distribution of a data item/change is controlled by acknowledgement messages. The distribution/transmission is repeated periodically until it succeeds.

The method of the present invention requires little additional memory, and there are no problems of overflow as it is the original file, where the data items merely have different states, that functions as a "buffer". In addition, the method renders it easy to withdraw such deletion of a data item even after the deletion has been effected, as the data item does not have to be deleted physically. Instead, a state information field is merely set to indicate that this data item has been deleted. This renders it even possible to delete logically interconnected data items in a controlled manner.

According to an embodiment of the invention, the capacity of a very large database can be improved by using a compact transmission list for rapid finding of those data items whose transmission/distribution has not yet succeeded. The purpose of the transmission list is to render it unnecessary to go through large databases in order for such data items to be found. When transmission lists are employed, similar overflows may occur as in separate buffers, but in such cases the use of a transmission list can be easily prevented until it is operational again. When the transmission list is out of use, the data items to be transmitted are searched for directly from the database by examining the state information fields of the data items.

BRIEF DESCRIPTION OF THE DRAWING

In the following, the invention will be described in greater detail by means of embodiments and with reference to the accompanying drawing, which is a schematic block diagram of a mobile radio system (this term being defined below in the Detailed Description) comprising a distributed database to which the method of the invention may be applied.

DETAILED DESCRIPTION OF THE INVENTION

The invention can be applied to any distributed database, but in the following it will be described by way of example in connection with a mobile radio system. In the simplest configuration, a mobile radio network is a local network comprising only one mobile exchange MX (local exchange) and a base station system which is controlled by the mobile exchange and may have several base stations BS1–BS3 providing services for a plurality of mobile radios MS1–MS3. In the drawing, for example, each mobile exchange MS1–MX6 alone may establish a local network.

A network configuration more extensive than that described above is a system network comprising a single system exchange SX and a plurality of local exchanges MX1–MX6. The local exchanges MX are connected in a star configuration to the system exchange SX1–SX2 over fixed links 1, such as cables. The system exchange SX1–SX2 acts as a central node between the local exchanges MX1–MX6. The system network is typically used when the capacity requirements exceed those satisfied by the local network. The system network is assumed to cover a single area where mobile radios roam and where the same services are required within the entire area.

The extended network configuration, in turn, comprises several system networks and local networks connected to a roaming information handler (RIH). A typical example is a nationwide radio network. The RIH serves only as a subscriber location information database. The system exchanges SX are connected to the RIH over data links 2, and calls between the system exchanges are connected over other links 3.

The registrations of the mobile radios MS enable the radio system to keep a record of the location of the mobile radio subscribers so that the calls to the mobile radio subscriber can be connected without that the calling party has to know where the subscriber is located.

The subscriber location information is divided between the RIH, SX and MX. The location information stored in the RIH indicates in which system exchange (SX) the subscriber is located. The location information stored in the system exchange SX indicates in which local exchange MX the subscriber is located. Finally, the location information stored in the MX indicates in which registration area the subscriber is located. When the subscriber changes the registration area within the local exchange, only the registration area information in the local exchange MX is updated. But when the subscriber roams to a registration area controlled by another local exchange MX, the location information of the system exchange SX is also updated and the previous local exchange MX is informed that the subscriber is no longer located within its area, as a result of which the MX removes the subscriber from its location register.

The subscriber data are stored in a central database of the SX. When the mobile radio subscriber registers to the local exchange MX, the subscriber data are transferred from the database of the system exchange SX to the database of the local exchange MX. When the mobile radio removes the registration or roams to the area of another local exchange MX, the subscriber data are removed from the database of the previous local exchange MX.

In a mobile radio system, the data stored in the databases are primarily subscriber data, and the changes concerning them may be, for example, addition/deletion/modification of a subscriber, registration/removal of registration of a subscriber to/from the MX, SX and RIH, etc. In the subscriber data contained in the databases, each data item can be identified, for example, by a subscriber identifier and the type of data.

According to the invention, a state information field is associated with each changeable data item, for indicating how far the distribution of a change pertaining to this data item has advanced in a distributed database system. After a data item has been added, deleted or modified, the state field of the respective data item is set to a state which indicates that the change should be transmitted to another database. When the change has been transmitted to the other database, an acknowledgement of receipt of the change is awaited from the other database, and after the acknowledgement has been received, the state field of the changed data item is set in a state which indicates that the change has been transmitted. In addition, it is periodically checked whether the database contains data items whose change transmissions have not been acknowledged and whose transmission should be repeated. The change is transmitted time after time until an appropriate acknowledgement is received.

In addition, each changed data item and transmitted change is provided with an age stamp which discloses the relative age of the change, whereby of two or more changes directed to the same data item, the one provided with the newest age stamp, i.e. the newest or latest change, is selected as being valid. Also, if the same data item is changed in the same database for several times so rapidly that all of the changes obtain the same age stamp, it must be ensured that it is the latest change that is transmitted forward. Such changes are distinguished by a modification identifier: different changes made to a certain data item in the same database always get individual identifiers if they have identical age stamps. Generally speaking, each change that changes the state of the state field of a data item is identified with a transaction type, an age stamp and a modification identifier.

In order to find the data items containing changes to be transmitted, it is necessary to go through the file of the entire database, which may be laborious when very large databases are concerned. In such very large databases, the efficiency of the method of the invention can be improved by employing a compact transmission list of the data items comprising changes to be transmitted. Every time a data item is added, deleted or modified, the identifier of said data item is added to the transmission list, and when an acknowledgement pertaining to the transmitted data item is received, the identifier of the data item corresponding to the acknowledgement is deleted from the transmission list. In this manner it is sufficient to monitor a relatively short transmission list instead of having to go through the entire database. When a transmission list is employed, similar overflows may occur as when separate buffers are used, but in such cases the use of a transmission list can be easily prevented temporarily until it is operational again. In a preferred embodiment of the invention, the use of the transmission list is prevented in a case of overflow until no changes to be transmitted are found in said database. Meanwhile, all data items of the database are examined in order to find the changes to be transmitted, which is more laborious but also more secure.

In the following, it is described by way of example and with reference to the drawing how the system exchange SX transmits a changed data item to a local exchange MX. When a change has been made to a data item, the SX checks the state of the data item and the type of the change, and transmits the data item to the MX. In addition, the SX writes the identifier of the subscriber whose data was changed to the transmission list of the SX, and increments a counter which indicates the number of the subscribers having changed data items which have been transmitted to the MX but not yet acknowledged. In this case, the transmission list is even more compact, as a single subscriber identifier can indicate all data items provided with the respective subscriber identifier in a database. At certain intervals, the SX checks the counter of the transmission list so as to find out whether there are changes on the list that have not yet been acknowledged. If such changes exist, it picks the subscriber number from the transmission list, searches for all such changes relating to this subscriber, and transmits this data to the correct MX. If overflow occurs in the transmission list, the counter is used to keep track of the number of the subscribers, and the data is read directly from the files of the database. The transmission list is not used again until there is nothing left in the database to be transmitted to the MX. The transmission of a certain changed data item to the MX is discontinued either if the SX receives an acknowledgement from the MX or if the SX observes that a newer change has been made in the MX, the newer change revoking the older change made in the SX. Then the SX sets the state of this data item to indicate that there is no need to send the change to the MX. If it is no longer necessary to transmit the data items relating to a certain subscriber identifier, it is removed from the transmission list, and the counter is decremented by one.

The drawing and the associated description are merely intended to illustrate the present invention. In its details, the method of the invention can be modified within the scope of the appended claims.

We claim:

1. A fault tolerant change distribution method in a distributed database system that includes at least two separate intercommunicating databases, at least part of the data stored therein having identical contents in the different databases, comprising the steps of:

(a) storing subscriber-related data, including changeable data items, in said databases, (b) identifying each data item of data stored in step (a) by a subscriber identity, (c) providing the changeable data items of the databases with state fields, (d) after a data item has been added, deleted or modified, setting the state field of the respective said data item in a first state which indicates that the change should be transmitted to another database, (e) adding the subscriber identity of the respective said data item to a transmission list containing subscriber identities of those data items in which said state field is in said first state, (f) transmitting the change to the other database, (g) periodically checking by means of the transmission list whether there are changes which have been transmitted but have not been acknowledged and which should be retransmitted, (h) receiving an acknowledgement of receipt of change from the other database, (i) setting the state field of the respective said data item in a second state which indicates that the change has been transmitted, (j) removing the subscriber identity from the transmission list when no one of the data items identified by said subscriber identity has said state field in said first state.

2. A method according to claim 1, further including:

providing each changed data item and transmitted change with an age stamp which discloses the relative age of the change, whereby of two or more changes directed to the same data item, the one provided with the latest age stamp is selected as being valid.

3. A fault tolerant change distribution method in a distributed database system that includes at least two separate intercommunicating databases, at least part of the data stored therein having identical contents in the different databases, comprising the steps of:

(a) providing the changeable data items of the databases with state fields, (b) after a data item has been added, deleted or modified, setting the state field of the respective said data item in a first state which indicates that the change should be transmitted to another database, (c) transmitting the change to the other database, (d) waiting for an acknowledgement of receipt of change from the other database, (e) after the acknowledgement has been received, setting the state field of the respective said data item in a second state which indicates that the change has been transmitted, (f) providing each changed data item and transmitted change with an age stamp which indicates the relative age of the change, (g) terminating the transmission of the change if it is observed that a newer change has been made to said data item in said other database which is the target of the transmission, said newer change revoking the change that is being transmitted, whereafter setting the state field of said data item to a state which indicates that there is no need to transmit the change.

4. A method according to claim 1, wherein:

the subscriber-related data stored in said databases are data of a data communications system, each data item being identified the type of data, and each change that changes the state of the state field of a data item being identified with a transaction type, an age stamp and a modification identifier, which distinguishes different modifications with the same age stamp.

5. A fault tolerant change distribution method in a distributed database system that includes at least two separate intercommunicating databases, at least part of the data stored therein having identical contents in the different databases, comprising the steps of:

(a) storing subscriber-related data in said data-bases, (b) identifying each data item by a subscriber identity, (c) providing each changeable data item in the databases with a state field, said state field having a first state which indicates that the respective data item has been added, deleted or modified and the change should be transmitted to another database, and a second state which indicates that the change has been transmitted to and acknowledged by another database, (d) maintaining a transmission list of subscriber identities of those data items in which said state field is in said first state, and (e) periodically checking by means of the transmission list whether there are changes which have been transmitted but have not been acknowledged and which should be retransmitted.

6. A method according to claim 5, wherein:

after addition, deletion or modification of a data item the subscriber identity of said data item is added to the transmission list, after receipt of an acknowledgement from the database which is the target of the transmission, removing the subscriber identity of the corresponding data item from the transmission list.

7. A method according to claim 5, further including:

adding a new subscriber identity to the transmission list as a result of a first change of the data item relating to said subscriber identity, removing the subscriber identity from the transmission list when there are no more unacknowledges changes relating to said subscriber identity.

8. A method according to claim 5, further including:

maintaining a counter reading of the number of data base items or subscriber identities on the transmission list.

* * * * *

UNITED STATES PATENT AND TRADEMARK OFFICE
CERTIFICATE OF CORRECTION

PATENT NO. : 5,509,118
DATED : April 16, 1996
INVENTOR(S) : TUULOS et al.

It is certified that error appears in the above-indentified patent and that said Letters Patent is hereby corrected as shown below:

On the title page:

change item [75] from "Matti Tuulos" to --Martti Tuulos--.

Signed and Sealed this

Sixth Day of August, 1996

Attest:

BRUCE LEHMAN

Attesting Officer

Commissioner of Patents and Trademarks